United States Patent

[11] 3,599,071

| [72] | Inventors | Robert Henri Lapuyade<br>Enghien;<br>Pierre Godard, Livry-Gargan, both of,<br>France |
|---|---|---|
| [21] | Appl. No. | 865,546 |
| [22] | Filed | Oct. 13, 1969 |
| [45] | Patented | Aug. 10, 1971 |
| [73] | Assignee | Societe Des Accumulateurs Fixes Et De Traction (Societe Anonyme)<br>Romainville, France |
| [32] | Priority | Oct. 15, 1968, Aug. 6, 1969 |
| [33] | | France |
| [31] | | NPV 170,015 and NPV 69-27049 |

[54] THERMALLY-RESPONSIVE CONTROLLED CHARGING ARRANGEMENT FOR STORAGE BATTERIES
28 Claims, 6 Drawing Figs.

[52] U.S. Cl. .................................................. 320/35,
307/66, 320/22, 320/31
[51] Int. Cl. ...................................................... H02j 7/10
[50] Field of Search............................................ 320/22-
—24, 31—33, 35—38; 307/46, 66

[56] References Cited
UNITED STATES PATENTS

| 2,747,108 | 5/1956 | Pelavin.......................... | 320/23 |
| 2,955,245 | 10/1960 | Payne et al. ................... | 320/35 |
| 2,967,988 | 1/1961 | Seright........................... | 320/36 |
| 3,102,221 | 8/1963 | Harmer.......................... | 320/36 |
| 3,123,758 | 3/1964 | Giacalone ...................... | 320/36 |
| 3,350,618 | 10/1967 | Barney et al.................... | 320/35 |
| 3,387,199 | 6/1968 | Billerbeck, Jr. et al. ....... | 320/35 |
| 3,457,489 | 7/1969 | Gentry, Jr. et al. ............ | 320/35 |
| 3,462,356 | 8/1969 | Wallinden....................... | 320/31 |

Primary Examiner—J. D. Miller
Assistant Examiner—John M. Gunther
Attorneys—Kenyon and Kenyon and Reilly, Carr & Chapin ABSTRACT: Thermally-responsive charging arrangement for a storage battery supplied from an AC source to provide DC charging voltage to the storage battery terminals, the arrangement being capable of charging at a high rate or at lower or zero rates as required, including a thermal probe responsive to battery temperature and a thermal probe responsive to ambient temperature, these probes being interconnected to supply a signal output which is a function of the difference between battery and ambient temperatures. The signal output actuates a control for the charging arrangement to switch its operation from high to lower or zero charging rates and vice versa respectively when the temperature difference detected by the thermal probes has a determined maximum value and a determined minimum value. The thermal probes may be resistances or transistors conductivity of which are functions of their temperatures. Timing means are also provided for limiting the period during which the battery is charged at a high rate.

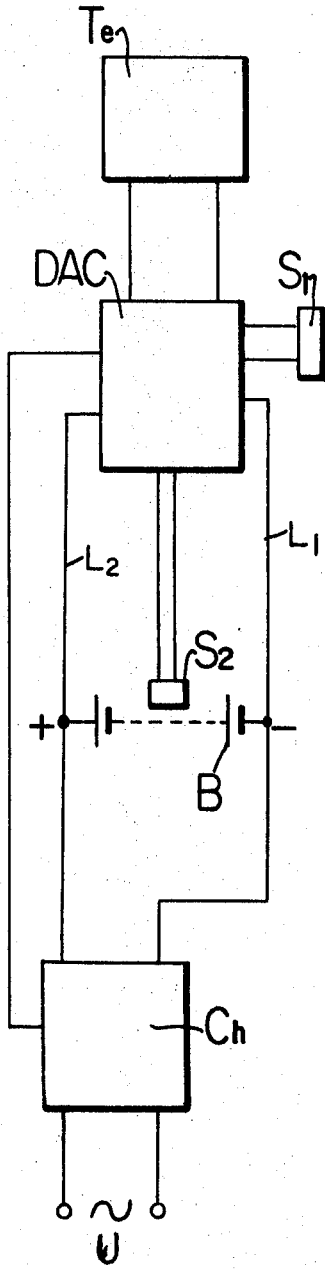
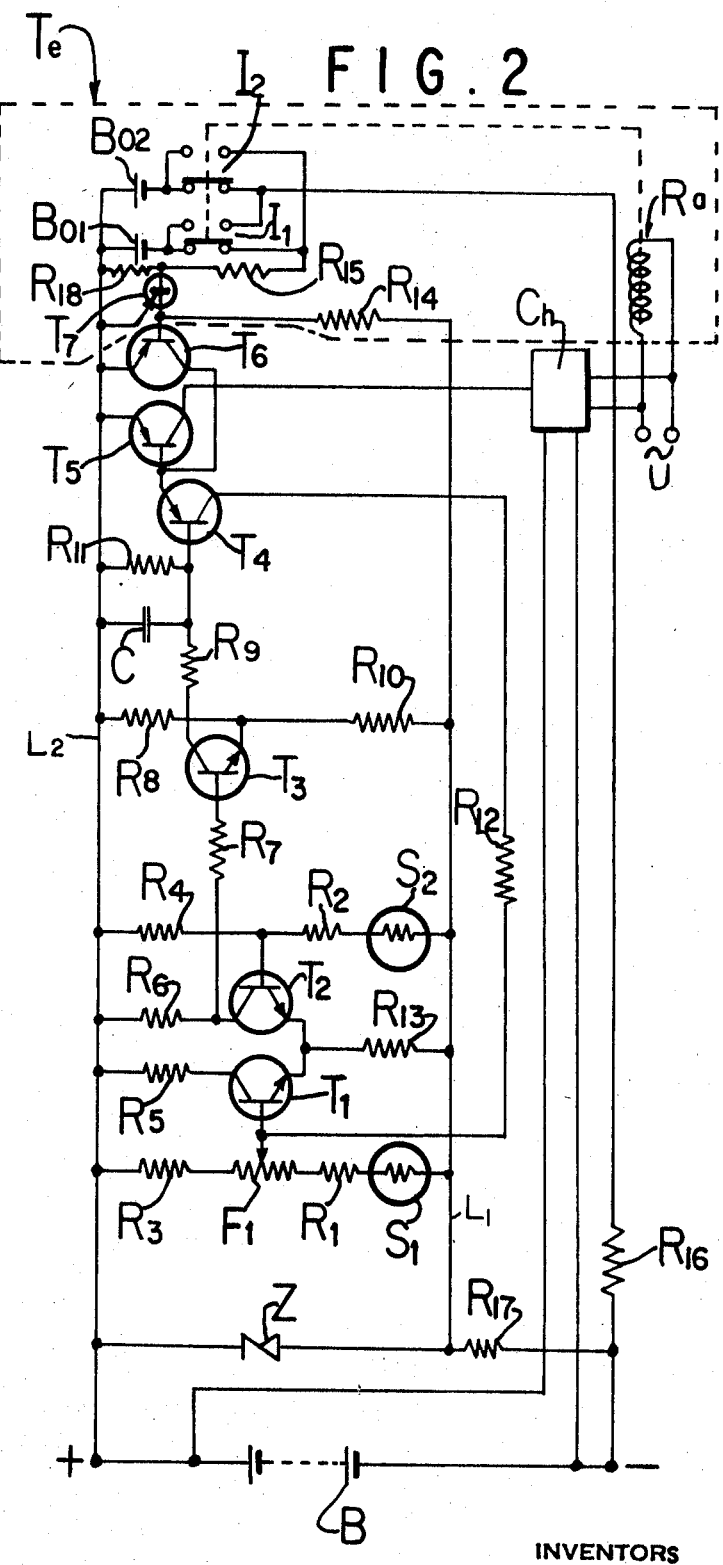
FIG.1
FIG.2
INVENTORS
ROBERT HENRI LAPUYADE
PIERRE GODARD
BY
Kenyon & Kenyon
ATTORNEYS

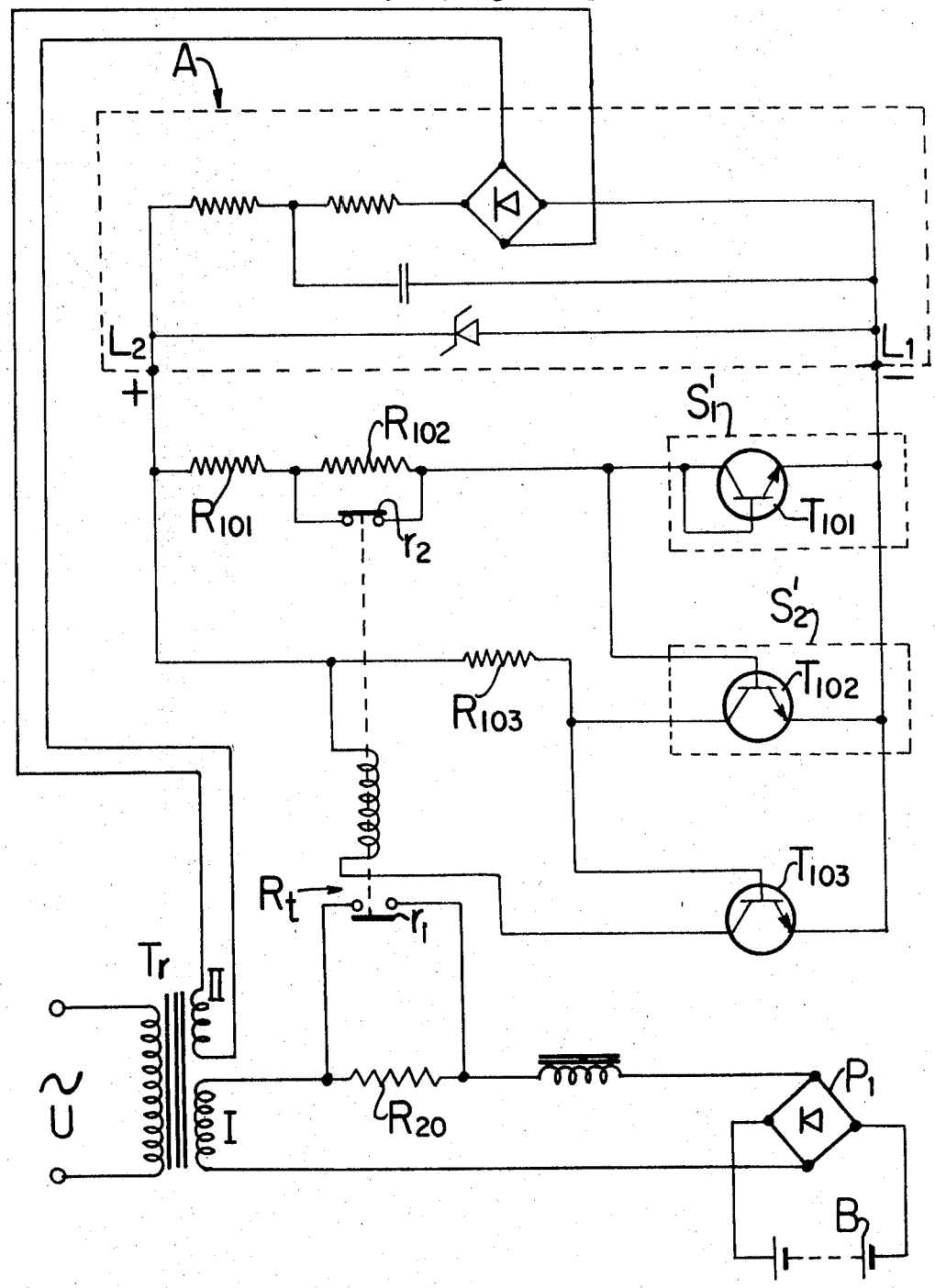

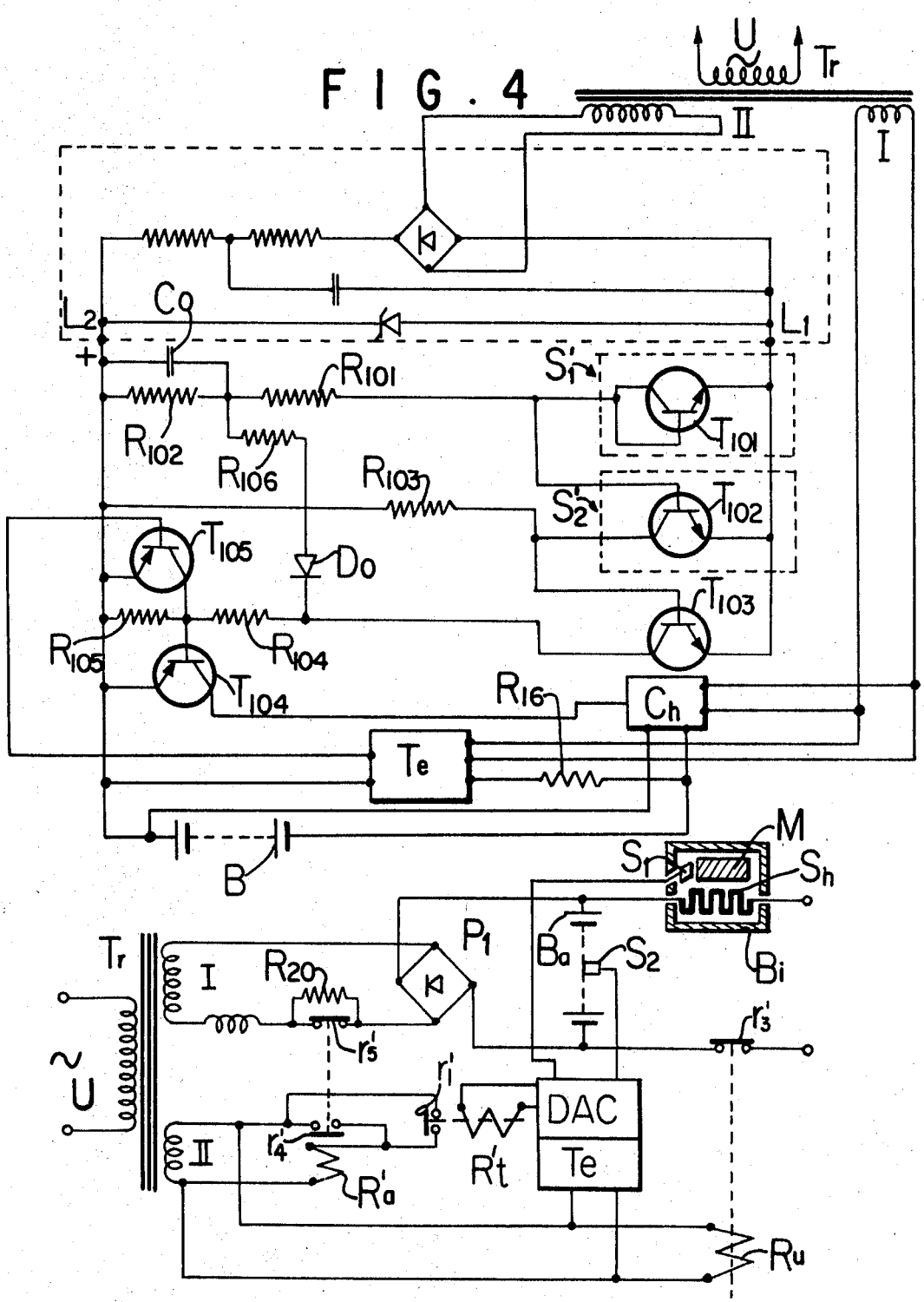

3,599,071

THERMALLY-RESPONSIVE CONTROLLED CHARGING ARRANGEMENT FOR STORAGE BATTERIES

BRIEF SUMMARY OF INVENTION

The invention relates to a thermally responsive controlled charging arrangement for storage batteries.

Battery-charger sets, equipped with thermostatic devices intended to control automatically the rate of charging of the battery by the charger as a function of the temperature of the battery, are already known. The thermostats thereof, of conventional type, control an electrical contact intended to cause changeover from rapid charging rate to trickle-charge, when the temperature of the battery reaches a given value. These devices present certain disadvantages.

Thus, at the beginning of the charging process:

When the initial temperature of the battery does not differ greatly from the temperature which brings about the change in charging rate, whilst still remaining lower than this latter, the regulation of charging is inaccurate.

When the initial temperature of the battery is higher than the temperature which causes the change in charging rate, the battery cannot be put on charge. This situation can arise following a very rapid discharge.

When the initial temperature of the battery is very much lower than the temperature which brings about the change of charging rate, there is a risk that the duration of the high rate of charge may be prolonged, and that the battery will be unnecessarily overloaded.

Likewise, battery chargers are known that are equipped with thermostatic devices capable of disconnecting the battery from the charger, or of changing from a high rate of charge to a lower rate of charge, when the difference between the temperature of the battery and the ambient temperature reaches a given value. Devices of this type, however, do not give complete satisfaction. In fact, in the case of an interruption in the current, they only allow charging of the battery at one rate:

If this rate is a high rate of charge, the aforementioned temperature difference increases markedly and the charging process is brought to a halt before the battery is properly charged; if this rate is a low rate of charge, the temperature difference is reached at the end of a very long period and is sometimes not reached at all, and this involves an excessively long charging period. When it is a case of changing the rate for a given temperature difference, the following disadvantages may appear:

The battery can come to be charged at a high rate, without reaching the predetermined temperature difference. The battery will then be overloaded at the high rate of charge, and this may damage it.

If the battery, having exceeded the temperature limit imposed, is discharged in use at a high rate, it will again heat up further and will no longer come to be rapidly recharged, since a stable high charging rate will not be able to be established.

With the battery being recharged at the low rate, after heating up, if the changeover to the high rate is effected for the same difference in temperature (in the reverse sense), a high rate of charge, even of very short duration, brings a risk of causing a new changeover to the low rate of charge, followed by a period of oscillation which, if it is prolonged, brings a risk of preventing the recharging of the battery at the high rate of charge.

The present invention has among its objectives, the remedying of these disadvantages. More precisely, the invention concerns an arrangement for the charging of a storage battery, also capable of serving as an emergency supply in the case of the breakdown of a network or mains (supply source) comprising a charger supplied from an AC source and whose output provides a DC voltage, connected to the terminals of the said battery, the said charger being capable of functioning at a first rate of charge known as the high charging rate and at a second rate of charge known as the low charging rate, a first thermosensitive device or thermal probe kept at the temperature of the surroundings, a second thermosensitive component or thermal probe arranged in such a manner as to be kept constantly at the internal temperature of the battery, the said first and second thermal probes being arranged in such a manner as to supply a signal output which is a function of the difference between the temperature of the battery and ambient temperature, characterized by the fact that it comprises first means which, under the action of the said signal output, cause the charging rate to pass from the high rate to the lower rate or to zero when the said difference reaches a first given maximum value, and to cause it to pass from the lower rate or from zero to the high rate, when the said difference reaches a second given minimum value, and second means for timing, limiting the duration during which the said first means can act upon the charging of the battery at the high rate.

Other objects and features of the invention will become apparent from the following detailed description and the accompanying drawings, wherein:

FIG. 1 is a schematic showing of a device in accordance with the invention;

FIG. 2 is a wiring diagram of one embodiment of a device in accordance with the invention, applicable to an emergency battery;

FIG. 3 is a diagram of a variation of the device in accordance with the invention wherein the thermosensitive components are transistors;

FIG. 4 is a variation of FIG. 3;

FIG. 5 is a diagram illustrating the application of the device with heating of the ambient temperature probe, to the recharging of a battery in an emergency supply unit.

DETAILED DESCRIPTION

Figure 6:
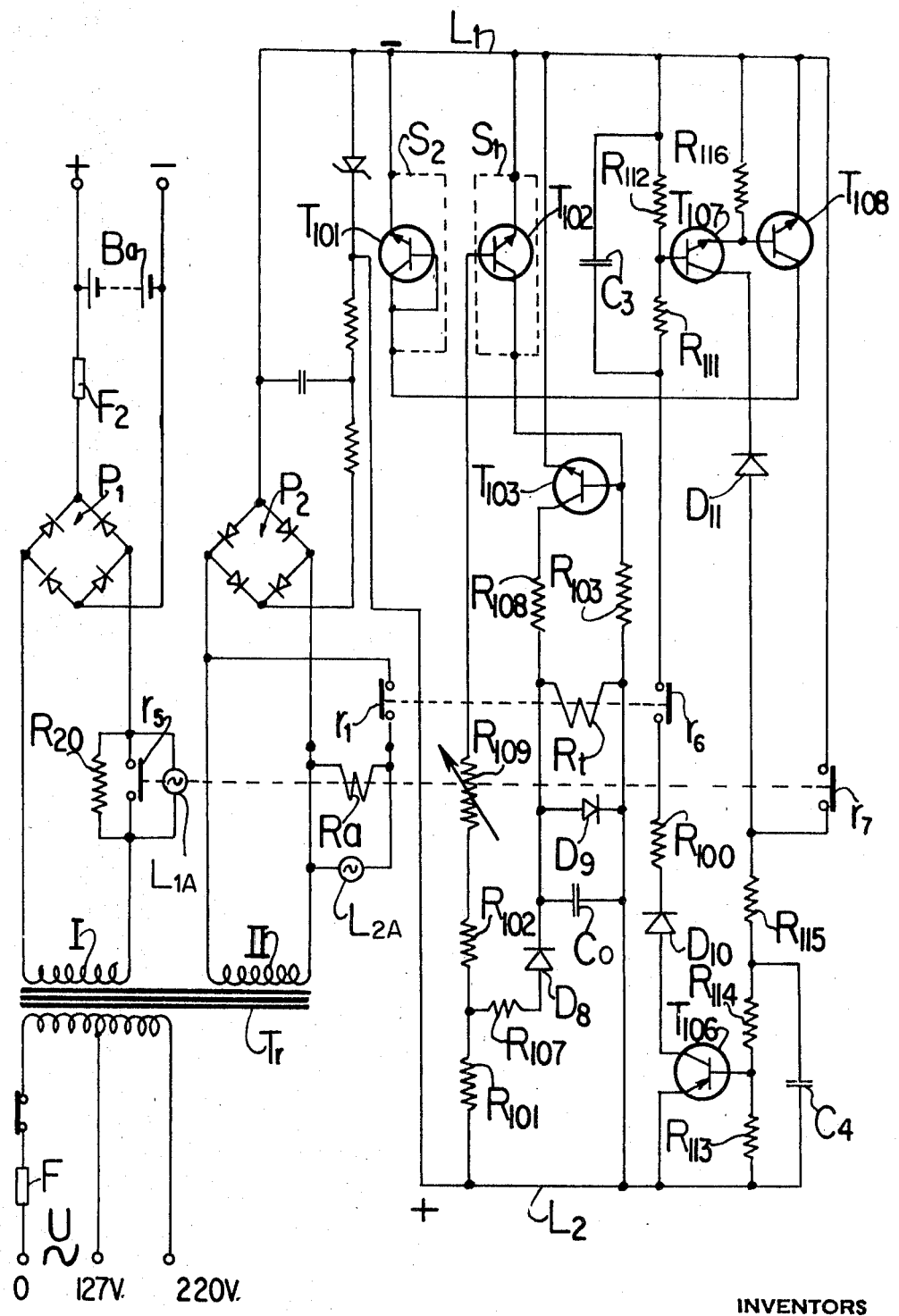
FIG. 6 is a diagram of a practical embodiment of the device in accordance with the invention applied to the control of a constant-current charger.

Referring to the drawings and first to FIG. 1, this FIG. 1 is a schematic showing of a device in accordance with the invention. This device comprises a first thermosensitive component or thermal probe, $S_1$, exposed to ambient temperature and a second thermosensitive component or thermal probe, $S_2$, exposed to the temperature of the battery B, electronic detecting, amplifying and control circuits DAC, which provide for the switching of the charger Ch either to its high-charge level or to its low-charge level, as a function of the temperature difference detected by the thermal probes, and a timing circuit Te which overrides the circuits DAC so as to cause compulsorily the switching of the charger to its low-charge level (trickle charge) with the occurrence of a timing delay which begins to run from the restoration of the power network after a breakdown of the latter.

The two levels or stages of the charger can correspond either to two rates of charge at constant voltage, to two rates of charge at constant current, to two rates of charge at decreasing current, or, again to a rate at constant voltage followed by a rate at constant current. In other words, the characteristics of the charger Ch can be selected according to the requirements, the functioning of the present device being solely to provide for the control of the charger Ch, that is to say, of the charging rate of the battery.

FIG. 2 is a circuit diagram of an arrangement in accordance with a first embodiment. This arrangement comprises two thermal probes $S_1$ and $S_2$ for temperature charge, which are each constituted by a metallic wire resistance having a positive temperature coefficient. The thermal probe $S_1$ measures ambient temperature and is advantageously fixed to a mass (for example, that of FIG. 5) which has a thermal inertia comparable to that of the battery B. The thermal probe $S_2$ measures the temperature of the battery B and is placed in close thermal contact with the latter, for example, on a connection between two elements situated at the center of the battery. The two thermally controlled probes $S_1$ and $S_2$ are electrically identical and are, as is noted, in contact with respective thermal masses of the same order of size.

The difference between ambient temperature and that of the battery, transposed into a difference of resistance, is detected and amplified by a conventional electronic differential amplification circuit, driving an output stage which is capable of acting directly on the control of the charger Ch or of energizing a relay Ra operating on the charger. A timing device Te to be described limits the functioning of the output stage of the charger Ch after the expiration of a given time $t$, to be counted from the reestablishment of the AC network source U, after a breakdown, in such a manner as to set the charger Ch compulsorily to its low or slow-charging level.

More precisely, the electronic differential amplifications circuit comprises two transistors $T_1$ and $T_2$ of NPN-type whose respective emitters are linked together and are connected via the resistor $R_{13}$, to the negative supply lead $L_1$ to the battery B. The voltage supply is provided by the charger Ch across a resistor $R_{17}$ and a Zener diode Z, serving to stabilize the voltage from the charger. The respective bases of the transistor $T_1$ and $T_2$ are biased through the intermediary of voltage dividers constituted respectively by the resistors $R_3$, $F_1$, $R_1$ and thermal probe $S_1$ and by the resistors $R_4$, $R_2$ and thermal probe $S_2$. The respective collectors of these transistors $T_1$ and $T_2$ are connected to the positive supply lead $L_2$ via the resistors $R_5$ and $R_6$; respectively. The collector of transistor $T_2$ is, in addition, connected to the base of a transistor $I_3$ of NPN type, via resistor $B_7$. The emitter of this transistor $T_3$ is connected to the negative and positive supply leads $L_1$ and $L_2$ via resistors $R_{10}$ and $R_8$, respectively, whilst the collector of this transistor $T_3$ is connected to the base of a transistor $T_4$ of PNP type, via a resistor $R_9$, the base of the transistor $T_4$ being, in addition, connected to the positive lead $L_2$ through a resistor $R_{11}$. The collector of this transistor $T_4$ is connected to the base of transistor $T_1$ via the resistor $R_{12}$ whilst the emitter of transistor $T_4$ is connected to the base of an output transistor $T_5$ of PNP type, whose emitter is connected to the positive lead $L_2$ and whose collector is connected to the control device for the charger Ch.

The timing device Te comprises inter alia transistor $I_6$ of PNP type, whose emitter and collector are connected, respectively, to the positive lead $L_2$ and to the base of transistor $T_5$. The base of transistor $T_6$ is connected, on the one hand, to the negative lead $L_1$, through the resistor $R_{14}$ and, on the other hand, to the collector of a transistor $T_7$ of the PNP type, whose emitter is connected to the positive lead $L_2$ and whose base is biased by a voltage dividing bridge formed by the resistors $R_{15}$ and $R_{18}$, of which the resistor $R_{18}$ is connected to the positive lead $L_2$. This voltage divider bridge is fed either by the button cell $Bo_1$, or by the button cell $Bo_2$, according to the position of the contacts $I_1$ and $I_2$ which are controlled by a latching relay $R_a$, supplied from the power mains U. It should be noted that the button cell which is not supplying the dividing bridge $R_{15}$, $R_{18}$ is charged by the charger via the resistor $R_{16}$.

The functioning of this arrangement in accordance with the invention follows: Assuming the temperature of the battery to be falling, for example, after a high rate of discharge during failure of the power mains U, the device in accordance with the invention then sets the charge to its low rate.

When the temperature of the thermal probe $S_2$ decreases, the current in the divider bridge constituted by probe $S_2$ and resistors $R_2$ and $R_4$ increases and, due to this, the bias of the transistor $T_2$ decreases. The collector current of the transistor $T_2$ then likewise decreases and the voltage at the terminals of the resistor $R_{13}$ tends to be lowered, causing an increase in the biasing of the transistor $T_1$ and of the collector current of this latter transistor. When the collector current of the transistor $T_2$ decreases, the biasing of the transistor $T_3$ increases and the collector current of transistor $T_3$ likewise increases. The transistor $T_4$ which is biased by the divider bridge formed by the resistors $R_9$ and $R_{11}$ begins to conduct when the collector current of the transistor $T_3$ becomes adequate. When transistor $T_4$ begins to conduct, a current passes through the resistor $R_{12}$ and the biasing of the transistor $T_1$ again increases. By cumulative action, the transistor $T_4$ becomes freely conductive. The transistor $T_5$, which is likewise biased by the voltage divider $R_9$, $R_{11}$, functions in a manner which is completely simultaneous with the transistor $T_4$ and likewise becomes conductive. This transistor $T_5$ can then act upon the conventional control device in the charger Ch, so as to establish the high rate of charging. As a variation, the transistor $T_5$ could, directly or indirectly, control the energization of a relay controlling the charger. This rapid charging obviously has some tendency to heat up the battery. The heating of the battery brings with it an increase in the resistance of the thermal probe $S_2$ and reduces the collector current of transistor $T_3$, and thus, the biasing of transistors $T_4$ and $T_5$, by a sequence which is the reverse of that which has just been described. At any given moment, when the temperature difference between thermal probes $S_1$ and $S_2$ attains the maximum set value, the transistor $T_5$ becomes blocked and sets the charger to the low rate of charge. It should be noted that the switching from the conductive state to the blocked state for the transistors $T_4$ and $T_5$ is produced by a greater difference in temperature between the battery and the surroundings than the switching from the blocked state to the conductive state, by reason of the aforementioned connection of the resistor $R_{12}$. The capacitor C prevents the transistors $T_4$ and $T_5$ from changing state prematurely, in the safety zone, by short-circuiting the stray currents which can be transmitted by the probe leads. The difference between the aforementioned maximum and minimum ranges of temperature, controlled by the choice of the resistor $R_{12}$ is some few degrees and has, as its objective, the avoidance of excessively frequent changes from one charging rate to the other, by utilizing the thermal inertia of the battery.

The passage from the high-charging rate to the lower charging rate and vice versa is possible during the complete duration of the timing delay determined by the timer device Te which functions as follows:

The bridging contacts $I_1$ and $I_2$ being in the position shown and the button cell $Bo_1$ being assumed to be charged, this button cell $Bo_1$ biases the transistor $T_7$ which is then conductive and shunts the biasing current of the transistor $T_6$, delivered by the supply, across the resistor $R_{14}$. The transistor $T_6$ is thus blocked as long as the battery cell $Bo_1$ is discharging at an adequate voltage into the divider bridge $R_{15}$, $R_{18}$, and it thus has no effect on the biasing of the output transistor $T_5$ which acts upon the charger.

At the termination of discharge of the button cell $Bo_1$, the transistor $T_7$ becomes blocked. The transistor $T_6$ is biased across the resistor $R_{14}$, and becomes conductive. The bias current of the transistor $T_5$ then passes through transistor $T_6$ and transistor $T_5$ becomes blocked, whatever the temperature difference measured by the thermal probes $S_1$, $S_2$, automatically bringing about the establishment of the low rate of charge. Whilst the button cell $Bo_1$ is discharging, the button cell $Bo_2$ is being charged, via the resistor $R_{16}$.

On the next power breakdown, and subsequent reestablishment of power at the mains U, the latching relay Ra becoming energized reverses the position of the bridging contacts $I_1$ and $I_2$ in such a manner that the button cell $Bo_2$ can supply the divider bridge $R_{15}$, $R_{18}$ whilst the button cell $Bo_1$ is being recharged.

It is to be understood that the capacity of the button cells $Bo_1$ and $Bo_2$ must be such as to ensure a timing delay sufficient to allow the complete recharging of the battery B.

In the case of the battery B having undergone no significant heating (for example, with a breakdown of short duration) the high rate of charge would obviously be established immediately.

Summing up, the arrangement depicted in FIG. 2 ensures the succession of the following operations, following the reestablishment of power at the mains U after a current failure during which the battery B has been discharged:

1. the battery is then at a temperature in the neighborhood of the surrounding temperature.

1-1. the immediate establishment of the high charging rate;

1-2. The interruption of the high charging rate, when the temperature of the battery rises, for example, by 12° C above the ambient temperature, it being possible to regulate this maximum value of the temperature difference accurately, with the aid of the potentiometer $F_1$;

1-3. The changeover to the high rate of charge when the temperature difference has returned to the minimum value which is, for example, 6° C. above ambient temperature;

The possibility of several changes from the high rate of charging to the low charging rate and vice versa, during the delay period;

1-4. The compulsory changeover to the low rate of change, at the end of the delay period.

2. The battery being warm, for example, due to a high rate of discharge.

2-1. The establishment of the low charging rate. At this rate, the battery cools down.

2-2. Changeover to the high rate of charge, when the temperature of the battery has fallen sufficiently. Subsequent functioning is as described from 1-2 to 1-4.

FIG. 3 is a diagram of the embodiment of the invention in accordance with a variation which differs in essence from that of FIG. 2, in that the thermal probe components $S'_1$ and $S'_2$ are transistors $T_{101}$ and $T_{102}$.

It is known that when a constant current passes the emitter-base junction of a transistor, the voltage at the terminals of this junction decreases linearly with increase in the temperature, within the working limits considered here. For example, for a certain type of transistor, it changes from 720 mv. at −20° C. to 575 mv. at +60° C.

In addition to the detection of temperature deviations, the transistors likewise provide for amplification.

Thus, in FIG. 3, a conventional device is shown at A, providing for rectification and stabilization of the current from AC mains U, and the supply of a DC voltage to the charging supply leads $L_1$ and $L_2$ ( − and +, for example). The thermally responsive device herein comprises three NPN transistors $T_{101}$, $T_{102}$ and $T_{103}$.

The transistor $T_{101}$ is utilized as a diode by connecting its base to its collector and in series with two resistors $R_{101}$ and $R_{102}$. It constitutes the ambient temperature probe $S'_1$, and is in close contact, for this purpose, with a thermal mass (like that, for example of FIG. 5) equivalent to that of the battery to be charged.

The transistor $T_{102}$ is in close thermal contact with the battery and serves as the battery thermal probe $S'_2$; its base is connected to the common collector-base point of the transistor $T_{101}$. A resistor $R_{103}$ is inserted into the circuit of collector of transistor $T_{102}$.

The base of transistor $T_{103}$ being connected to the common point of the resistor $R_{103}$ and the collector of transistor $T_{102}$, the transistor $T_{103}$ is placed under the control of transistor $T_{102}$. Into the circuit of its collector are connected the windings of the electromagnetic relay $R_t$, controlling the high rate of charge. This relay $R_t$ comprises a bridging contact $r_2$ which can shunt the resistor $R_{102}$ and one other bridging contact $r_1$ for controlling the battery charging circuit proper across the resistor $R_{20}$. The bridge contacts $r_2$ and $r_1$ are shown in the rest position (the resistor $R_{102}$ is short-circuited).

Supposing, for example, that a high rate of charge is in operation. There has been breakdown of the local AC electricity supply U, the battery B has been discharged and its temperature $T_B$ is different from ambient temperature $T_A$.

If the temperature difference $T_B-T_A$ is small, the current passing through the resistor $R_{101}$ is divided substantially equally between the emitter-base junctions of the transistors $T_{101}$ and $T_{102}$ and the transistor $T_{102}$ draws only a small proportion of the current flowing in the resistor $R_{103}$. The transistor $T_{103}$ is then conductive and the relay $R_t$ is energized short-circuiting resistor $R_{20}$.

As the temperature of the transistor $T_{102}$ increases, its emitter-base voltage decreases.

The temperature, and consequently the threshold of the transistor $T_{101}$ being assumed to be unchanged, the base current of the transistor $T_{102}$ increases and the current taken by the transistor $T_{101}$ decreases. When the temperature difference between the transistors $T_{101}$ and $T_{102}$ reaches 12° C, for example, the transistor $T_{102}$ tends to conduct increasingly and, at this instant, practically the whole of the current supplied by way of the resistor $R_{103}$ passes through it. The transistor $T_{103}$ then becomes blocked and the relay $R_t$ becomes deenergized reinserting resistor $R_{20}$ into the battery charging circuit.

The result is that the battery changes to the low rate of charge; that is, the rate of trickle-charge, mains voltage being present. The device is set, for example, so that the relay is energized for a temperature difference $T_B-T_A$ lower than 6° C. and is released to the position shown in FIG. 3, for a temperature difference $T_B-T_A$ greater than 12° C.

In addition, in order to insure clear-cut functioning of the relay $R_t$ and to obtain the desired temperature difference for its energization and release, this relay $R_t$ comprises the auxiliary bridging contact $r_2$ which modifies the biasing current of the transistors $T_{101}$ and $T_{102}$:

with the relay energized (bridging contact $r_2$ open), the biasing current decreases due to the insertion of $R_{102}$; it is then necessary for the temperature of the transistor $T_{102}$ to undergo a definite rise in order to secure the deenergization of the relay $R_t$.

with the relay $R_t$ released or deenergized the biasing current increases and the temperature of the transistor $T_{102}$ needs to undergo a definite fall in order that the relay will again become energized.

It is, of course, possible to add to the temperature control device which has just been described a time-delay component such as that previously described, that is to say, which comprises the association of memory batteries and of transistors, to form a control circuit for the charger.

FIG. 4 shows a diagram of a device in which the electromagnetic relay $R_t$ of FIG. 3 is replaced by a control transistor $T_{104}$, which layout is well adapted to a time-delay component and to the direct control of a charger with two levels of constant voltage. The collector of transistor $T_{103}$ is here in series with resistor $R_{104}$ and $R_{105}$ and a tapping, which includes a resistor $R_{106}$ and a diode $D_o$ which is connected between the common point of resistors $R_{101}$ and $R_{102}$ and the common point of resistor $R_{104}$ and the collector of transistor $T_{103}$. The transistor $T_{104}$ of PNP type is connected by its base to the common point between resistors $R_{105}$ and $R_{104}$, and to the positive lead $L_2$, via its emitter. Its collector circuit is connected to the voltage regulator of the charger Ch. The transistor $T_{105}$, of PNP type is connected via its emitter to the positive lead $L_2$ and via its collector, to the common point of resistors $R_{104}$ and $R_{105}$ and its base receives a control voltage supplied by the time-delay device Te A capacitor $C_o$ shunts the resistor $R_{102}$. The remainder of the circuit is identical to that of FIG. 1, and functions as follows:

The thermal probe transistors $T_{101}$ and $T_{102}$ function as like transistors $T_{101}$ and $T_{102}$ of FIG. 3, transistor $T_{103}$ remaining under the control of transistor $T_{102}$. However, when transistor $T_{103}$ is conductive, a demand ensues for current across the resistor $R_{106}$ and diode $D_o$, which causes the current passing through resistor $R_{101}$ to be reduced (this is equivalent to the action of the bridging contact $r_2$ of relay $R_t$ of FIG. 3). In addition, the transistor $T_{104}$ is biased and controls regulation of charging.

The transistor $T_{105}$ is blocked when the timing device Te is in operation, it becomes conductive at the termination of the timing delay and short-circuits the resistor $R_{105}$, which at the same time effects the blocking of the transistor $T_{104}$.

In order to ensure the starting of the high charging rate immediately after the reestablishment of mains voltage U, even in the case where previous discharge of the battery B at a high rate has caused it to heat up, the following particular devices can be provided.

The thermal mass which acts as the ambient temperature standard for thermal probe $S'_1$ having an inertia comparable to that of the battery, may be heated with the aid of a shunt resistor as in FIG. 5 inserted in the circuit between the battery and the load. This shunt can supply the few watts necessary for heating the ambient probe $S'_1$.

The changeover to rapid charge after discharge of the battery can thus be produced immediately on the reestablishment of power at mains supply U.

This process can be made use of, due to the constitution of the ambient probe $S'_1$. In effect, this probe $S'_1$ is composed of a metallic mass (M as in FIG. 5) of about 1 kg on which the transistor $T_{101}$ or an equivalent probe, is mounted and the assembly is enclosed within an insulating casing ($B_i$ as in FIG. 5). In the case of sudden variation of ambient temperature, the variation in temperature of the probe as a function of time is very close to the variation of the temperature of the battery, when not in use or on trickle charge.

The heating of the probe $S'_1$ with the aid of the shunt (Sh as in FIG. 5) allows, as it were, the storage of a quantity of heat corresponding to the discharge.

The assembly of such a device can be seen further in detail in FIG. 5. The shunt Sh is situated near the mass M and the thermal probe $S_1$ within an insulating casing Bi. It is connected electrically into the discharge circuit of the battery Ba and heating of the shunt Sh takes place only in the case of breakdown of the power network or mains U. In effect, the network or mains U supplies two secondaries I and II, through the agency of the transformer Tr. The first secondary I, supplies after rectification with the aid of a rectifier bridge $P_1$, DC voltage for charging the battery Ba; the second II serves for the supply to a relay $R'_a$, the circuits DAC and at the same time, a relay Ru whose bridging contact $r'_3$ closes connecting the battery to the load circuit in case of breakdown of power in the mains supply U. Within the block indicated by DAC — Te are situated the detection-amplification-control-timing circuits already mentioned, consisting of a relay $R'_t$ similar to relay $R_t$ of FIG. 3, whose bridging contact $r'_1$ is capable of closing the circuit of the relay $R'_a$; this latter can maintain itself energized once it has been closed, due to a bridging contact $r'_4$ in this relay, which also has a second bridging contact $r'_5$ which can shunt a resistor $R_{20}$ in the circuit of the secondary windings I.

After restoration of mains voltage U and discharging of the battery Ba, the relay $R'a$ is not in operation, its circuit not being closed through bridge contact $r'_1$ and charging is carried out at the high rate, the resistor $R_{20}$ being short-circuited by bridging contact $r'_5$. When the temperature $T_B$ of the battery Ba rises, for example, from 10 to 12° above that of ambient temperature $T_A$, the relay $R'_t$ is released, bridging contact $r'_1$ closes, relay $R'_a$ is energized and because of bridging contact $r'_4$ holds itself in locked condition. The resistor $R_{20}$ is placed in functional operation and the battery Ba is charged at the low rate. Return to the high rate can only be effected after a renewed failure of the power mains supply U.

Referring now to FIG. 6, showing another embodiment of the invention, like components of preceding FIGS. bearing the same reference symbols play corresponding functions. A rectifier bridge $P_1$ supplies the battery Ba as in FIG. 5, and another bridge $P_2$ provides the necessary voltage for the thermal probe circuits and supplies, after filtering and stabilization, the negative and positive leads $L_1$ and $L_2$. In the example of FIG. 6, it will be noticed that the roles of the transistors $T_{101}$ and $T_{102}$ have been interchanged, relative to those of FIGS. 3 and 4, so as to reverse the functioning of the relay Rt, relative to the case shown in FIG. 3.

The device functions, firstly, as a differential temperature control system, transistor $T_{101}$ responding to battery temperature $T_B$, transistor $T_{102}$ responding to ambient temperature $T_A$ and transistor $T_{103}$ being controlled by transistor $T_{102}$ and energizing the relay $R_t$ as in FIGS. 3 and 5.

After the restoration of mains voltage U, when $T_B$ increases at the end of charging and reaches a value equal to $T_A + 12°C$, the relay $R_t$ is energized. It must be able to remain energized in certain cases (see later) until the next breakdown of the mains U; failing this, oscillations will occur between the two rates of charge.

If the battery Ba is at an elevated temperature, e.g. $T_A + 12°$ C. at the instant of the reestablishment of power at the mains U, the relay Rt is energized immediately. It is normally released when the battery temperature has fallen again to the value of $T_A + 6°$ C.

In effect, the current supplied through the resistors $R_{101}$, $R_{102}$ and adjustable resistor $R_{109}$ is divided between the emitter base junctions of the transistors $T_{103}$ and $T_{102}$, when the difference in their temperature is small. The transistor $T_{102}$ then draws virtually the entirety of the current circulating in the resistor $R_{102}$. The transistor $T_{103}$ is blocked and the relay $R_t$ is in the deenergized position ($r_1$ then is closed).

The temperature $T_A$ and consequently the threshold of the transistor $T_{102}$ being assumed not to have changed, the current drawn by the said transistor increases with battery temperatures $T_B$ and the base current of the transistor $T_{102}$ decreases. When the temperature difference $T_B - T_A$ attained exceeds 12°C. the transistor $T_{102}$ begins to become blocked and the current passing through the resistor $R_{103}$ polarizes the transistor $T_{103}$ and relay Rt becomes energized so that bridging contact $r_1$ opens and bridging contact $r_6$ closes.

In order to insure clear-cut functioning of the relay $R_t$ and to obtain an energization and release of the relay $R_t$ for the required temperature difference, its circuit is completed by the resistor $R_{107}$ and the diode $D_8$ in series, connecting the common point of resistors $R_{101}$ and $R_{102}$ to one end of the windings of the relay $R_t$ connected to the collector of transistor $T_{103}$ via a resistor $R_{108}$, the other end of the relay winding being connected to the base of transistor 103 through the intermediary of the resistor $R_{103}$.

The relay $R_t$ being energized, the resistor $R_{107}$ draws a proportion of the current passing through the resistor $R_{101}$. The current passing through the resistors $R_{102}$ and $R_{109}$ decreases and the polarization of the transistor $T_{102}$ decreases. It thus becomes blocked further, and the base current of transistor $T_{103}$ increases.

It is thus necessary for the temperature of the transistor $T_{101}$ to decrease definitely in order to allow transistor $T_{102}$ to begin again to conduct and to draw the major part of the current passing in the resistor $R_{103}$, which entails the blocking of transistor $T_{103}$ and the release or deenergization of relay $R_t$.

A second function of the system consists in the automatic charging of the battery in the most suitable manner.

For this, when the relay $R_t$ is in the deenergized or rest position, with mains voltage U present, the relay $R_a$ is energized, the resistor $R_{20}$ is short-circuited via bridging contact $r_5$ and the charger $P_1$ is in operation, charging with a high current, which is indicated by the lighting of the lamp $L_{2A}$ and the extinction of the lamp $L_{1A}$. (The positions are reversed, with the low rate of trickle-charging.)

When the battery temperature $T_B$ reaches the assigned value at the termination of charging, the relay $R_t$ becomes energized and brings about the changeover to the trickle-charging rate. It is then necessary to keep it energized until the next breakdown of the power supply network or mains U, in order to avoid successive changes in the rate of charge, whose frequency would correspond to the thermal inertia of the battery.

On the other hand, if the battery temperature is equal to or higher than the value assigned, at the time when the mains voltage U is reestablished, it is necessary to allow the release of the relay $R_t$ after cooling of the battery, so as to permit charging at the high rate.

These contradictory requirements are provided for by the transistors $T_{106}$, $T_{107}$ and $T_{108}$, the auxiliary bridging contacts $r_6$ and $r_5$ of the relay $R_t$ and $R_a$ and the delay capacitators $C_3$ and $C_4$.

The bridging contact $r_6$ of the relay $R_t$ closes a circuit originating from the positive lead $L_2$, passing through the emitter-collector circuit of the transistor $T_{106}$, the diode $D_{10}$, the resistor $R_{100}$, the bridging contact $r_6$, and two resistors $R_{111}$ and $R_{112}$, to terminate at the negative lead $L_1$. Resistors $R_{111}$ and $R_{112}$ are shunted by a capacitor $C_3$ and their common point is connected to the base of a transistor $T_{107}$. A second circuit, originating from positive lead $L_2$, passes through the resistors $R_{113}$, $R_{114}$ (shunted by a capacitor $C_4$) a resistor $R_{115}$, a diode $D_{11}$, the collector-emitter circuit of transistor $T_{107}$ and a resistor $R_{116}$ to negative lead $L_1$. The base of transistor $T_{108}$ is connected to the common point of the emitter of transistor $T_{107}$ and of the resistor $R_{116}$, its collector being connected to the collector of transistor $T_{101}$ and its emitter to the negative line $L_1$. The negative line $L_1$ is itself connected to the common point of resistor $R_{115}$ and diode $D_{11}$ by a bridging contact $r_7$ of the relay $R_a$.

The functioning can be summarized in the following manner:
a. restoration of mains voltage U, battery "warm";
  relay $R_t$ energizes immediately;
  relay $R_a$ energizes and immediately releases, during the reaction time of the relay $R_t$;
  capacitor $C_4$ has insufficient time to charge up and the transistor $T_{106}$ remains blocked (inadequate period of closing of the auxiliary bridge contact $r_7$ of the relay $R_a$),
  no supply to capacitor $C_3$ and the transistors $T_{107}$ and $T_{108}$ remain blocked;
b. battery cooling (or reestablishing of mains voltage, battery "cold"):
  relay $R_t$ is deenergized (or is not energized);
  relay Ra becomes energized; capacitor $C_4$ is charged and, after a few seconds, the transistor $T_{106}$ becomes conductive,
  auxiliary bridge contact $r_6$ of relay Rt not closed, the capacitor $C_3$ is not charged. Transistors $T_{107}$ and $T_{108}$ remain blocked.
c. Rise of battery temperature at end of charge;
  relay Rt becomes energized;
  relay Ra is released; transistor $T_{106}$ kept polarized by the capacitor $C_4$, charges capacitor $C_3$,
  transistor $T_{107}$ is substituted for the auxiliary bridge contact $r_7$ of the relay Ra, so as to keep the capacitor $C_4$ charged;
  transistor $T_{108}$ draws practically the whole of the biasing current of the transistor $T_{101}$ which can no longer become unblocked;
The relay $R_t$ thus remains energized during the entire duration of the presence of mains supply voltage U, and is no longer influenced by battery temperature $T_B$.
d. Breakdown of mains voltage U, of a duration less than 1 minute.
  The capacitor $C_3$ and $C_4$ are not completely discharged and the relay Rt is energized again immediately on the reestablishment of mains voltage U. The charger remains in trickle-charging operation.
d. Mains breakdown, of a duration longer than 1 minute.
  Capacitors $C_3$ and $C_4$ no longer effect the polarization of the transistors $T_{106}$, $T_{107}$ and $T_{108}$.
  If the battery is warm, the cycle recommences as set out in a).
  If the battery is cool, the cycle recommences as set out in b.

Various modifications could be applied to the device in accordance with the invention. Thus, the means limiting the duration could consist of a relay which might be a function of the number of ampere hours discharged by the battery, instead of being a fixed delay. In order to embody such a delay device, reference might be made, for example to the device described in the French Pat. No. 1,512,535.

Likewise, the devices for limiting the duration could consist of a device limiting the number of charge-rate changeover processes.

What we claim is:
1. A thermally responsive arrangement for charging a storage battery from a source of supply comprising a charging circuit supplied by said source for delivering DC charging current to the battery, control means connected to said charging circuit for switching the charging rate of said current between a higher value and a lower value in response to a signal, a first thermal probe means responsive to battery temperature, a second thermal probe means responsive to ambient temperature, an electric circuit interconnecting said thermal probe means to provide a signal output which is a function of the difference between battery temperature and ambient temperature, signal output actuated means connected to said control means and actuated by said signal output for changing over the charging current rate from the higher value to the lower value when the temperature difference becomes equal to or greater than a determined maximum value and from the lower value to the higher value when the temperature difference becomes less than or equal to a determined minimum value, and electronic timing means connected to said signal actuated means for limiting the time period during which said signal output actuated means can act upon said control means to charge the battery at the higher value charging rate following interruption and restoration of power from said source.

2. A thermally responsive charging arrangement for a storage battery according to claim 1, wherein said thermal probe means each comprise electrically conductive components whose resistance varies as a function of the temperature of the component.

3. A thermally responsive arrangement for charging a storage battery from a source of supply comprising a charging circuit supplied by said source for delivering DC charging current to the battery, control means connected to said charging circuit for switching the charging rate of said current between a higher value and a lower value in response to a signal, a first thermal probe means responsive to battery temperature, a second thermal probe means responsive to ambient temperature, an electric circuit interconnecting said thermal probe means to provide a signal output which is a function of the difference between battery temperature and ambient temperature, signal output actuated means connected to said control means and actuated by said signal output for changing over the charging current rate from the higher value to the lower value when the temperature difference becomes greater than or equal to a determined maximum value and from the lower value to the higher value when said temperature difference becomes less than or equal to a determined minimum value, said thermal probe means each comprising a transistor having an emitter, base, and collector whose resistance at a junction varies as a function of temperature.

4. A thermally responsive arrangement for charging a storage battery from a source of supply comprising a charging circuit supplied by said source for delivering DC charging current to the battery, control means connected to said charging circuit for switching the charging rate of said current between a higher value and a lower value in response to a signal, a first thermal probe means responsive to battery temperature, a second thermal probe means responsive to ambient temperature, each of said thermal probe means being thermal probe transistors including respectively emitters, collectors and bases, each of whose resistances at a junction varies as a function of temperature, an electric circuit interconnecting said thermal probe means to provide a signal output which is a function of the difference between battery temperature and ambient temperature, signal output actuated means connected to said control means and actuated by said signal output for changing over the charging current rate from the higher value to the lower value when said temperature difference reaches or exceeds a determined maximum value and from the lower value to the higher value when said temperature difference becomes less than or equal to a determined minimum value, said thermal probe transistors being interconnected in said electric circuit as a differential circuit which produces and amplifies said signal output.

5. The arrangement of claim 4, in which the thermal probe transistors have their respective emitters connected together and to an output terminal of said charging circuit and have their respective collectors connected to another output terminal of said charging circuit, by way of resistor-type dividing bridges connected to polarize said transistors to control the said signal output to actuate said control means to control said charging rate.

6. A thermally responsive charging arrangement for a storage battery according to claim 4, including a third transistor connected between said thermal probe transistors and said control means such that the changeover of said third transistor between blocked and conductive states is determined by the value of said signal output from said thermal probe transistors, said changeover actuating said control means to cause said charging circuit to switch its charging rate between the higher and lower values.

7. A thermally responsive charging arrangement for a storage battery according to claim 1, in which said electronic timing means comprises a first and a second storage cell, means interconnecting said storage cells for enabling one cell to be charged by said arrangement simultaneously with the discharge of the other cell, a fourth transistor connected to be polarized to conductive state by and during the discharging of either of said cells at or above a predetermined rate of discharge, a fifth transistor connected to be maintained in a blocked state when said fourth transistor is conductive, the reduction of discharge rate of the discharging one of said cells below said predetermined rate causing said fourth transistor to be blocked and said fifth transistor to become conductive, and connections between said fifth transistor and said control means which maintain the charging rate of said charging circuit at its low value while said fifth transistor is conductive, whereby the reduction in the rate of discharge of the cell which is discharging below the predetermined rate of discharge precludes the charging circuit from charging at the higher rate.

8. A thermally responsive charging arrangement for a storage battery according to claim 7 in which said timing means further comprise a relay responsive to breakdown and restoration of said source of supply, said relay being electrically connected with respect to said storage cells so that upon reestablishment of the supply after the breakdown said relay effects recharging of the storage cell which has become discharged and effects polarization of said fourth transistor to a conductive state by the discharge of the other of said storage cells which has already been charged.

9. A thermally responsive charging arrangement for a storage battery according to claim 3 wherein said thermal probe transistors comprise base-emitter circuits connected electrically via their bases, one of said transistors being connected as a diode, said arrangement also comprising resistors, said transistors being connected in series with at least one of the resistors so that the source of current flowing in said one resistor is divided between the thermal probe transistors in accordance with their temperature change of resistance, switching means for the charging arrangement capable of alternating said rate of charge between its higher and lower values, and a third transistor controlled by one of the two thermal probe transistors so as to actuate said switching means.

10. A thermally responsive charging arrangement for a storage battery according to claim 3 further comprising timing means for limiting the time period during which said signal output actuated means can act upon said control means for charging the battery at the higher value charging rate, following interruption and restoration of power from said source.

11. A thermally responsive charging arrangement for a storage battery according to claim 9, wherein said switching means comprises a relay, said relay being of the electromagnetic type and having bridging contact means moveable to insert into and remove from the charging circuit a limiting resistor for limiting the charging rate of the battery, said control relay being connected to an additional relay in the collector circuit of the transistor connected as a diode, so as to increase the resistance in said collector circuit when said control relay is positioned to remove said resistor from the charging circuit.

12. A thermally responsive charging arrangement for a storage battery according to claim 11, in which said source is an AC source, and in which charging of the battery is effected by DC voltage, after rectification of AC supply and including a transformer with two windings, one of said windings being connected across the charging circuit comprising the said limiting resistor, and the other winding supplying, after rectification, the transistors and their respective circuits.

13. A thermally responsive charging arrangement for a storage battery according to claim 9 wherein the control means comprise a control transistor, controlled by the said third transistor and directly effecting the charging circuit to regulate the charging rate.

14. A thermally responsive charging arrangement for a storage battery according to claim 13 including another transistor electrically interposed between said third transistor and said control transistor, and a time delay circuit controlling said another transistor, whereby said control transistor, and said charging rate of said charging circuit, can be regulated by the time delay circuit.

15. A thermally responsive charging arrangement according to claim 25 wherein said first and second thermal probe means comprise transistors, the resistances across elements thereof being dependent on temperature.

16. A thermally responsive charging arrangement according to claim 3 and further comprising a heat absorptive mass thermally associated with said probe responsive to ambient temperature, the thermal inertia of said mass being substantially equal to that of said battery.

17. A thermally responsive arrangement for charging a storage battery from a source of supply comprising a charging circuit supplied by said source for delivering DC charging current to the battery, control means connected to said charging circuit for switching the charging rate of said current between a higher value and a lower value in response to a signal, a first thermal probe means responsive to battery temperature, a second thermal probe means responsive to ambient temperature, an electric circuit interconnecting said thermal probe means to provide a signal output which is a function of the difference between battery temperature and ambient temperature, signal output actuated means connected to said control means and actuated by said signal output for changing over the charging current rate from the higher value to the lower value when the temperature difference reaches or exceeds a determined maximum value and from the lower value to the higher value when the temperature difference reaches or falls below a determined minimum value said arrangement additionally having means for overriding said electric circuit and control means to permit establishment of a high rate of charge of the battery immediately following a discharge of said battery, not withstanding that the discharge has raised the temperature of the battery such that the difference between the ambient and the battery temperature exceeds said predetermined maximum value.

18. The arrangement of claim 17, in which said means for overriding includes a mass having thermal inertia substantially equal to that of the battery in thermal contact with the probe means responsive to ambient temperature, a shunt impedance connected to carry battery discharge current, the shunt being positioned to heat the mass when the battery discharges, the degree of said heating being thereby a function of the amount of discharge of the battery.

19. The arrangement of claim 1 having a heat absorptive mass whose thermal inertia is approximately equal to that of the battery in thermal contact with said probe means responsive to the ambient temperature.

20. The arrangement of claim 3 having a heat absorptive mass whose thermal inertia is approximately equal to that of the battery in thermal contact with said probe means responsive to the ambient temperature.

21. The arrangement of claim 4 having a heat absorptive mass whose thermal inertia is approximately equal to that of the battery in thermal contact with said probe means responsive to the ambient temperature.

22. The arrangement of claim 25 having a heat absorptive mass whose thermal inertia is approximately equal to that of the battery in thermal contact with said probe means responsive to the ambient temperature.

23. A thermally responsive charging arrangement for a storage battery according to claim 10, comprising further an additional transistor connected to and serving to lock the thermal transistor probe responsive to ambient temperature in a given state, and a relay having a bridging contact, said additional transistor being actuated to lock said thermal transistor probe responsive to ambient temperature in a given state upon the closing of the bridging contact, said arrangement in rendered incapable of charging the battery at the higher rate.

24. The arrangement of claim 23, further including a time delay transistor stage responsive to breakdown and restoration of power from said source connected to said additional transistor whereby said additional transistor is actuated at a predetermined elapsed time after breakdown and restoration of power from said source.

25. A thermally responsive charging arrangement for charging a storage battery, capable of serving also as the emergency supply in case of breakdown of a power source, comprising a charger supplied by a source of AC current, and whose output supplies a DC output connected to the terminals of the said battery, said charger being able to charge the battery alternatively either at a high rate, or at a lower rate, a first thermal probe means maintained at ambient temperature, a second thermal probe means arranged in such a manner as to be maintained constantly at the internal temperature of the battery, the said first and second thermal probe means being disposed in relation to each other so as to supply a signal which is a function of the difference between the temperature of the battery and ambient temperature, signal actuated means which under the action of the said signal cause charging to change from the high rate to charging at lower rate when the said difference reaches a first given maximum value, and which cause charging to change from the lower rate to the high rate when the said difference reaches a second given minimum value, and timing means which limits the period during which the said signal actuated means can act to effect charging of the battery at the high rate.

26. A thermally responsive charging arrangement for a storage battery according to claim 25, wherein the said thermal probe means each comprise an electrically conductive component whose resistance has a value which is a function of temperature.

27. A thermally responsive charging arrangement for a storage battery according to claim 26 including a transistorized differential detection circuit which produces and amplifies said signal, said circuit comprising a first and a second transistor whose emitters are connected together and are connected to an output terminal of the charging arrangement and whose collectors are connected to another output terminal of the said arrangement, a divider bridge of resistors for polarizing said transistors, one of which is one of the thermal probe means.

28. A device in accordance with claim 25, wherein said signal actuated means comprise a third control transistor, the changeover of which, from the blocked state to the conductive state, is determined by the value of the said signal and controls the changeover from the lower rate of charging to the high rate of charging.